United States Patent Office 3,032,830
Patented May 8, 1962

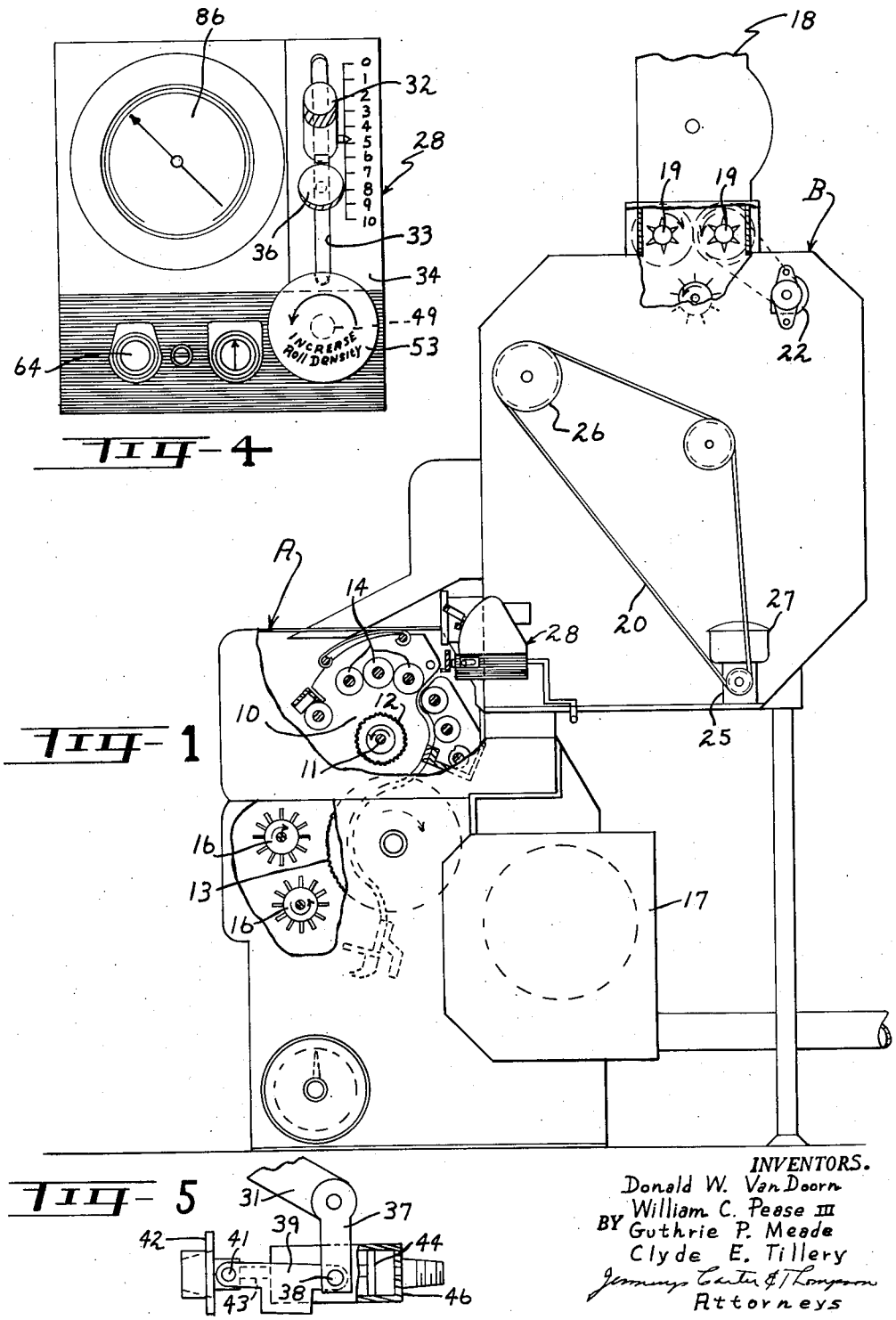

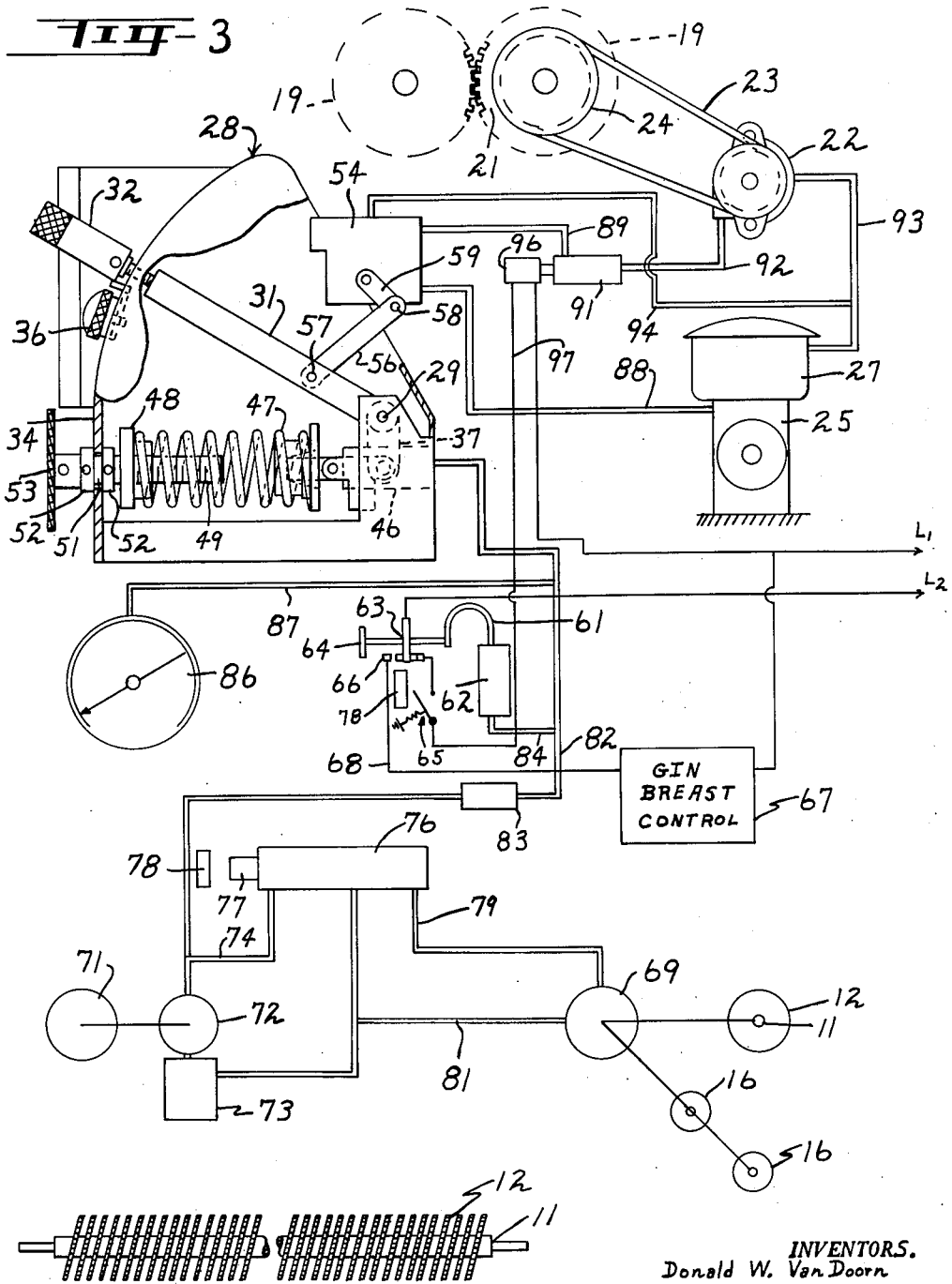

3,032,830
INTERCONNECTED COTTON GIN AND FEEDER
Donald W. Van Doorn and William C. Pease III, Columbus, Ga., Clyde E. Tillery, Phenix City, Ala., and Guthrie P. Meade, Coral Gables, Fla., assignors to Lummus Cotton Gin Company, a corporation of Georgia
Filed July 5, 1960, Ser. No. 40,835
8 Claims. (Cl. 19—202)

Our invention relates to cotton gins and feeders therefor and particularly to means effective to regulate the feed of seed cotton to the gin in accordance with a predetermined amount of torque required to rotate the seed roll in the gin.

In this art it has heretofore been the practice in some gin and feeder installations to regulate the feed rate of seed cotton to the gin in accordance with what has been considered to be the true density of the roll. However, such means has comprised a pressure plate or the like surrounding at least a part of the surface of the seed roll, together with mechanical linkages to translate the movement of such plates into a motion to control the rate of feed of the feeder. While such appparatus has been fairly satisfactory, our invention contemplates controlling the speed of the feed rollers in accordance with the power required to rotate the seed roll. Thus, our invention contemplates apparatus especially adapted for association with the type of gin shown, described and claimed in application of William C. Pease III and Arvel L. Vandergriff, Serial No. 794,960, filed February 24, 1959, "Saw Type Cotton Gin and Process for Ginning Cotton." Our apparatus is thus characterized by obtaining more accurate and more immediate response to the admission of cotton from the feeder, automatically, in accordance with the predetermined amount of power required to rotate the seed roll in the gin.

In view of the foregoing an object of our invention is to provide apparatus of the character designated in which there is obtained a signal from the drive means for the seed roll which bears a direct relation to the power required to turn the seed roll, and means to utilize such signal to drive the feeder at a rate of speed to increase or decrease the flow of cotton to the gin, thereby to gin at a selected rate and with a roll of selected density.

A more limited object is to provide apparatus of the kind indicated in which the seed roll and feed rollers of the feeder are driven by separate prime movers, preferably fluid pressure motors such as hydraulic motors, and in which there are fluid pressure and electrical control means interconnecting the two, whereby the feed rate is maintained in direct relation to the power required to drive the seed roll.

Other objects are to drive the gin picker rollers from the same prime mover that drives the seed roll, thus to give an indication of choke in the gin at either or both of those points; to tie in the seed roll and picker roll drive with apparatus to throw out the gin breast when the saws or picker rollers become overloaded or choked; and in general to provide apparatus which is especially suited to modern, fully automated ginning systems.

Apparatus illustrating features of our invention is shown in the accompanying drawings forming a part of this application;

FIG. 1 is a somewhat diagrammatic, partly sectional view of a gin and feeder embodying our improvements;

FIG. 2 is a detached view of one form of shaft and wobble plate assembly which is suitable for agitating the seed roll in the gin;

FIG. 3 is a wholly diagrammatic view illustrating our improved control mechanism;

FIG. 4 is a front elevational view of the controls for the rate of feed of the seed cotton and for the density of the seed roll in the gin; and, FIG. 5 is a detailed partly sectional view of the hydraulic cylinder utilized in our improved apparatus in connection with controlling the density of the seed roll in the gin.

Referring now to the drawings for a better understanding of our invention and particularly to FIG. 1, we show our invention associated with a cotton gin which is indicated generally by the letter A and a seed cotton feeder for the gin indicated generally by the letter B. It will be understood that the gin A embodies a breast which may be thrown to out or inoperative position to stop the operation of the gin. Thus, the gin has the usual seed roll box 10. In accordance with the invention forming the subject matter of the above identified application, there is placed adjacent the center of the roll box a shaft 11. On the shaft 11 are a plurality of wobble plates 12 which may have teeth on their peripheries. See FIG. 2. The shaft 11 is driven as disclosed in said application thus to oscillate a feed roll back and forth over the tops of the saws 13 which, of course, are also driven. The roll box is provided around at least a part of its periphery with a plurality of elongated freely rotatable, non-driven rollers 14 the purpose of which is to reduce the friction of rotation of the roll in the roll box. The gin is also provided with picker rollers 16 which serve the normal and usual purposes of such rollers and which are driven as hereinafter will be explained. The type of gin illustrated is an air blast type and the structure indicated at 17 represents the air supply for the doffing nozzles. However, as will later appear our invention has utility when associated with other types of gins.

The feeder B comprises the inlet section 18 for seed cotton. On top of the feeder, at the bottom of the inlet section, are feed rollers 19 which are positively driven in unison as indicated in FIG. 3 by gears 21. As is customary these rollers may be star shaped and since they are driven in unison the amount of cotton dropped into the feeder depends upon the speed of rotation of the rollers 19.

In accordance with our invention the feed rollers 19 of the feeder are driven by an independent prime mover which is indicated as being a fluid pressure motor 22. The drive is through the belt 23 and over a pulley 24 fast on one of the shafts carrying one of the rollers 19. Fluid under pressure for the motor 22 is supplied by a pump 25 mounted on the side of the feeder housing. The pump may be driven by a belt 20 passing over a pulley 26 mounted on one of the driven shafts projecting through the end of the feeder casing. The pump is provided with a reservoir 27. Thus, and as will later appear, the pump 25 is driven whenever the feeder is in operation, and the motor 22 is driven whenever our improved control system is in a certain position. The details of the hydraulic connections between the pump 25 and motor 22 will be later set forth.

Mounted on one end of the fixed part of the gin stand is a housing indicated generally by the numeral 28. Pivotally mounted at 29 in the housing and to a stationary part thereof is a lever 31 having an operating handle 32. The lever projects through a slot 33 in a front plate 34 of the housing. As will later appear, the operating handle 32 is the control for determining the rate of rotation of the feed rollers 19. Also operating in the slot 33, and adjustable therein is a stop 36. The stop may be loosened by means of the nut thereon and slid up and down in the slot, thereby to determine the lowermost position of the lever 31, while not restricting the upward movement of the lever.

It will be noted that the lever 31 has a bell crank portion 37 adjacent the pivot point 29. The bell crank 37 is pivotally connected at 38 to a link 39 in turn pivotally connected at 41 to a spring seat member 42. The spring seat member 42 is carried on the end of a piston rod 43 which carries on its inner end a piston 44 slidably fitting within a small hydraulic cylinder 46. The cylinder 46 in turn is mounted in fixed manner in the housing 28.

A compression spring 47 rests with one end against the flange of the spring seat member 42. The opposite end of the spring is received against a shouldered or flanged nut 48. The nut 48 is threadably received on a shaft 49. The shaft 49 is mounted in an opening 51 in the front plate 34 of housing 28. Stop collars 52 prevent axial movement of the shaft 49. Mounted on the outer end of the shaft is a control knob 53 which controls the density of the seed roll as later will appear.

Also mounted in the housing is a three way fluid pressure valve 54. The valve 54 is under control of the lever 31 by means of a link 56 pivotally mounted to the lever at 57 and at 58 to an operating handle 59 of the valve.

Also mounted in the housing 28 is a curved tube type pressure responsive device embodying the curved tube proper indicated at 61 and the pressure unit therefor indicated at 62. The end of the curved tube 61 serves to throw a two position, snap type switch 63. The switch 63 is of the manual re-set type and, for convenience may be mounted in the casing directly behind a manual re-set button indicated at 64 in FIG. 4 of the drawings. The closing of contact 66 energizes a gin breast throw-out mechanism indicated generally by the numeral 67 through line 68 and the power supply lines $L^1$ and $L^2$ as shown. Specifically, the gin breast control means may be of the type shown, described and claimed in Patent No. 2,761,178 dated September 4, 1956, and issued to Donald W. Van Doorn and William C. Pease III. Suffice it here to say that the breast control is connected to the breast and when energized moves the breast.

The agitator shaft 11 and the disc 12 thereon as well as the picker rollers 16 all are driven by a fluid pressure motor 69. Power for the motor 69 may be supplied by an electric motor 71 mechanically connected to a pump 72. The pump 72 has the usual reservoir 73. Fluid under pressure is supplied through a line 74 to the body of a three way valve 76. Valve 76 has an operating stem 77. The valve 76 is mounted in stationary manner on the gin so that when a movable part 78 of the gin breast moves into ginning position, the valve is shifted to the right as viewed in FIG. 3 of the drawing. When the valve stem is shifted to the right, fluid under pressure is supplied through a line 79 to the motor 69 and returns to the reservoir through line 81. A switch 65 is operatively connected to movable part 78 whereby switch 65 is closed only when the gin breast moves into ginning position.

Pressure from the line 74 is also impressed, through a line 82, onto the end of the hydraulic cylinder 46. However, for the purpose of eliminating pulsations we provide a pulsation damper 83 in line 82. A branch line 84 also connects the pressure line 82 to the pressure cylinder 62 of the curved tube 61. A gauge 86 also is connected to the line 82 by a branch line 87.

Reverting now to the valve 54, it will be seen that pressure from the pump 25 is delivered to the valve 54 through a line 88. From the valve fluid under pressure is supplied through a line 89 to a solenoid controlled valve 91 and thence through a line 92 to the fluid motor 22. Fluid returns through a line 93 to the reservoir 27. A by-pass return line 94 is provided.

The valve 91 is provided with a solenoid 96 which is in circuit with the switch 63 through a line 97 as shown.

From the foregoing the method of constructing and using our improved apparatus together with the advantages thereof may now be explained and understood.

It will be appreciated that when the handle 32 is raised one effect of this motion is to further compress spring 47. Also, this moves the operator 59 for the valve 54, determining the amount of fluid to be admitted in unit time to the motor 22 from pump 25, thus determining the speed of the feed rollers 19. By running in and out on the nut 48 through rotation of the control handle 53, the compression of the spring 47 may be further modified. Therefore, with the speed of the feed selected by positioning lever 31 and the maximum amount of feed thereof being determined by holding the lever in this position by means of the stop 36, the gin and feeder are started. The motor 71 is energized to start pump 72 delivering the fluid. Assuming that the gin breast is now out it will be understood that the operator 77 of valve 76 is in position to cause the fluid to by-pass from the pump 72 back to the reservoir 73. Also, by providing switch 65 which is open when movable part 78 of the gin breast is out of ginning position, valve 91 is closed, shutting off fluid from motor 22. Further, with the switch 63 in the position shown in FIG. 3 and with the gin breast in ginning position solenoid 96 is energized, holding valve 91 open, permitting motor 22 to rotate thus to drive the rollers. Seed cotton thus is fed into the breast of the gin, forming a seed roll which is agitated or oscillated back and forth by the wobble plates 12 on shaft 11.

As the seed roll builds up in the gin roll box 10 the power required of motor 69 to rotate the shaft 11 increases to the maximum amount required to rotate the roll at the rate of cotton being delivered in accordance with the setting of lever 31. That is to say, at a given rate of the feed of the seed cotton to the gin, since the speed of the saws 13 is constant, the gin will be ginning at a given rate and the roll will be at a given density. However, if for any reason the roll becomes denser than that determined by the compression of spring 47 it will be apparent that more power will be required to turn motor 69. This therefore increases the pressure in line 74 and causes the piston 44 of the cylinder 46 to move further inwardly, further compressing the spring 47. At the same time, this causes the bell crank 37 of lever 31 to pivot to the left as viewed in FIGS. 3 and 5 of the drawing. This moves the lever 31 upwardly as viewed in FIG. 3, thereby to decrease the flow of fluid to motor 22, decreasing the rate of feed of cotton to the gin. In the event the gin chokes, either by choking of the saws around the ribs or otherwise, or by the picker rollers becoming choked themselves, excessive pressure beyond a predetermined amount is built up in lines 74 and 82. This energizes the bent tube member 61 and throws the switch 63. The effect of this is to de-energize the solenoid 96, permitting valve 91 to move to a position which causes a by-passing of the fluid from pump 25 back to reservoir 27 without going through the motor 22. At the same time, the gin breast control mechanism automatically is operated when a contact on the switch arm contacts with contact 66 throwing the breast to inoperative position.

From the foregoing several additional advantages of our invention over prior apparatus will be apparent. For one thing, in the old, mechanical linkage control it was necessary to have a mechanical joint between the gin and the feeder in order to transmit the motion of the roll feeder plate to the linkage. Our improved apparatus gives a true reading of the variations in torque which is indicative of the need for more or less cotton. In other words, with our improved apparatus, cotton automatically is fed to the gin precisely at the rate which the predetermined roll density indicates is necessary to maintain that density. In the event of chokes or other stoppages our improved apparatus acts quickly and automatically to throw out the gin breast, eliminating damage to the gin parts.

From the foregoing it will be apparent that we have devised an improved feed control for gins. In actual practice our invention has proved to be extremely practical and satisfactory. While we have shown and described fluid pressure motors as being the sources of power for the feed rollers and the agitator and picker rollers of the gin, it will be apparent that other types of motors such as electrical motors may be used. In this case electrical circuits may be substituted for the hydraulic lines. However, the use of hydraulic systems as distinguished from electrical systems as shown herein have the advantages set forth in this application.

While we have shown our invention in but one form, it will be obvious to those skilled in the art that it is not so limited, but is susceptible of various changes and modifications without departing from the spirit thereof, and we desire, therefore, that only such limitations shall be placed thereupon as are specifically set forth in the appended claims.

What we claim is:

1. The combination with a saw type cotton gin having a roll box to receive a seed roll and a feeder, of means in the roll box of the gin positively to rotate the roll, drive means for the roll rotating means, means responsive to variations in the torque required to rotate said roll rotating means to produce a signal corresponding to said variations in torque, variable speed drive means for said feeder, and means to vary the speed of the feeder drive means in conformity with said signal.

2. The combination with a saw type cotton gin having a roll box to receive a seed roll and a movable breast together with a seed cotton feeder therefor having feed rollers, of a variable speed drive for the feed rollers, control means to vary the speed of said drive, constant speed means positively to rotate a seed roll in the roll box, torque sensing means operatively associated with the seed roll rotating means, and means operatively connecting the torque sensing means to the control means for said variable speed drive, whereby upon an increase in said torque above a predetermined value the speed of the feed rollers is decreased.

3. The combination of claim 2 including apparatus effective when energized to move the gin breast to inoperative position, and means included in the torque sensing means to energize the said gin breast apparatus thereby to render the gin inoperative when said torque exceeds said predetermined value.

4. The combination of claim 2 in which there is included mechanism which when energized throws out the gin breast, mechanism associated with said variable speed feed roller drive which when de-energized stops the same, and means operatively associated with all said mechanisms effective upon an increase in said torque above said predetermined value to energize the breast throw-out mechanism and de-energize the feed roller drive.

5. The combination with a cotton gin having a roll box and a feeder for the gin having feed rollers, of rotating means in the gin roll box for rotating a seed roll therein, a prime mover for driving the rotating member and having the characteristic of generating a signal which is indicative of variations in torque required to drive said member, an independent variable speed prime mover for driving the feed rollers, signal responsive means on which the signal is impressed and operatively associated with the prime mover for the feed rollers to vary the speed thereof in accordance with the torque developed by the prime mover driving said rotating member, and adjusting means operatively associated with the signal responsive means to determine the speed at which the feed rollers are driven in response to said signal.

6. The combination of claim 4 in which the gin is equipped with a movable breast, power driven means associated with the breast and effective when energized to move the breast from ginning to inoperative position, control means effective when de-energized to stop the prime mover for the feed rollers, and means responsive to the development of said torque in excess of a predetermined value to energize the power driven breast means and de-energize the control means for the prime mover driving the feed rollers.

7. The combination with a saw type cotton gin having a roll box and a movable breast and a feeder therefor having feed rollers, of rotating means in the roll box effective to rotate a seed roll therein, a first fluid pressure motor connected in driving relation to said rotating means, a source of fluid under pressure for said first motor, a second fluid pressure motor connected in driving relation to the feed rollers, a second source of fluid under pressure for said second motor, a single acting fluid pressure cylinder having a piston and piston rod, a fluid pressure connection to the cylinder from the source of fluid under pressure supplying the first named motor, a valve controlling the flow of fluid to the second motor, means operatively connecting the piston rod of said cylinder to the flow control valve, whereby an increase in pressure impressed on the first motor tends to close the valve, and adjustable means biasing the valve toward open position, whereby the amount of cotton delivered by said feed rollers and hence the density of said roll are determined by the setting of said adjustable means.

8. In a cotton gin and feeder combination wherein the gin has a roll box and picker rollers and the feeder embodies rotating feed rollers, the improvement comprising a rotating member in the roll box of the gin effective to rotate a seed roll therein, a first fluid pressure motor connected in driving relation to the rotating member and to said picker rollers, a source of fluid under pressure for the first motor, a second fluid pressure motor connected in driving relation to the feed rollers, a source of fluid under pressure for the second motor, a flow valve controlling the flow of fluid to the second motor, a pressure responsive device on which the operating pressure for the first motor is impressed and having a movable part, means connecting said movable part to the flow valve whereby an increase in pressure on the first motor tends to close the flow valve, and an adjustable spring opposing the pressure responsive movement of said movable part, whereby the feed rollers are driven at a rate having a direct relation to the difference between the pressure urging said movable part in one direction and the force of said spring urging it in the opposite direction.

No references cited.